UNITED STATES PATENT OFFICE.

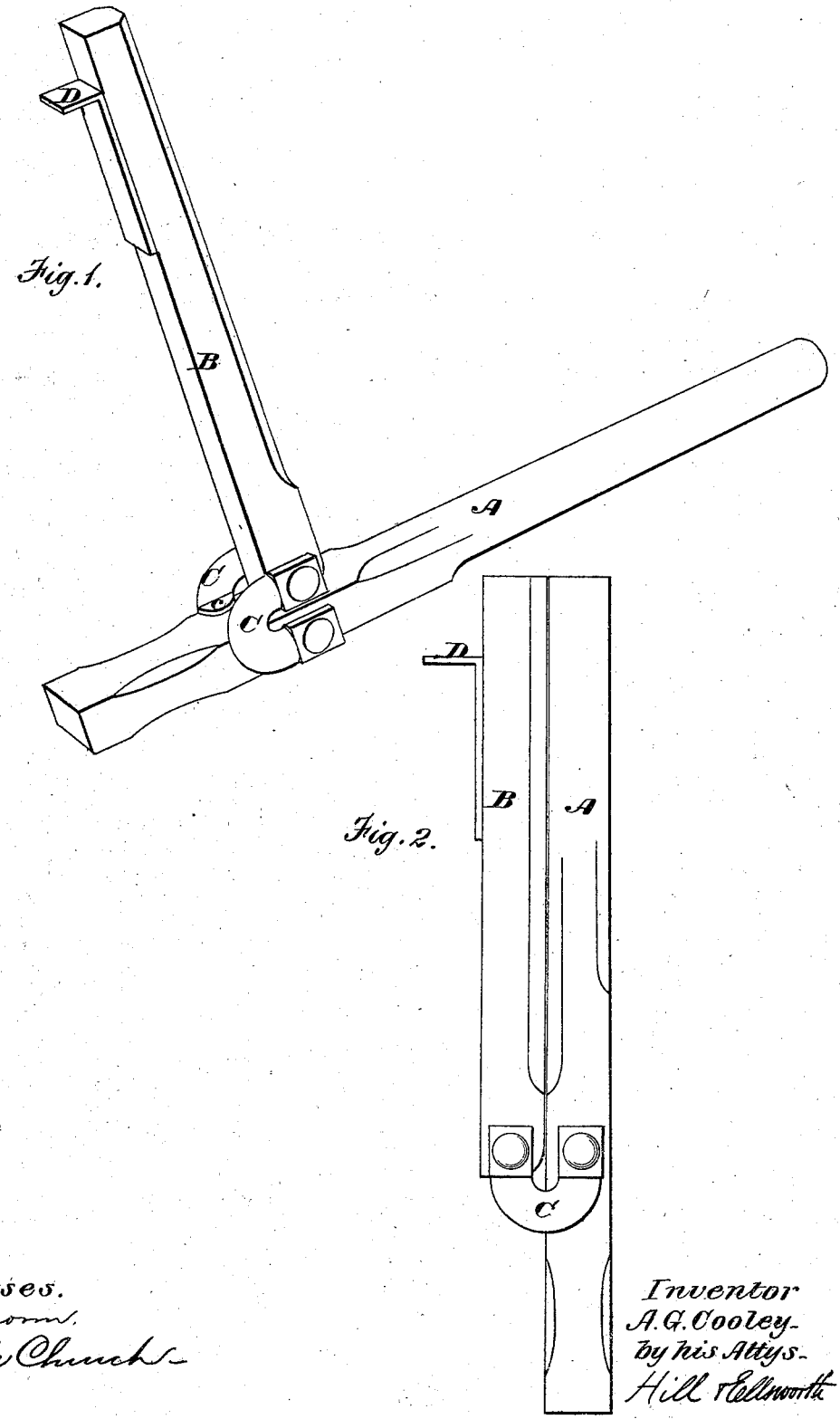

ALFRED G. COOLEY, OF HILLSBOROUGH, OHIO.

IMPROVEMENT IN WAGON-JACKS.

Specification forming part of Letters Patent No. 143,886, dated October 21, 1873; application filed April 2, 1873.

*To all whom it may concern:*

Be it known that I, A. G. COOLEY, of Hillsborough, in the county of Highland and State of Ohio, have invented a new and Improved Wagon-Jack; and I do hereby declare the following to be a full and exact description of the same, reference being had to the accompanying drawings forming part of this specification, in which—

Figure 1 is a perspective view of the lever in position for lifting, and Fig. 2 is a side elevation of the same in a position for supporting the wagon.

Similar letters of reference in the accompanying drawings denote the same parts.

This invention has for its object to provide an improvement in wagon-jacks, which, when not in use, can be folded compactly, and which, when desired to be used, can be advantageously employed to raise and lower the axle of a wagon or carriage with little labor, and which will hold the axle in an elevated position as long as may be necessary. To this end the invention consists in the construction and combination of parts, which I will now proceed to describe.

In the accompanying drawings, A represents a lever of a convenient length to be used about the lifting of a wagon-axle, said lever having a square lower end to aid in keeping it in an upright position when holding up an axle. B is a bar, jointed at its lower end between plates C, which are firmly secured to the sides of the lever A, and extend out from the same far enough to afford a support for the bar B, said plates having flanges $c$ extending inward from the inner sides of the plates C, and bearing against the edge of the lever A, which flanges serve to strengthen the plates C. D is a rest, fixed on the outside of the bar B near its upper end.

When this apparatus is to be used, the lower end of the lever A should be placed on the ground plumb under the axle to be raised, and the upper end of the lever lowered far enough to allow the rest D to catch under the axle. Then, by raising the upper end of the lever A until both it and the bar B are vertical and in contact, the axle is raised, and, the weight of the wagon being on the rest D, the lever A is thereby held against the bar B, and the axle supported as long as required. By drawing back the lever A the axle is gradually lowered till the wheels touch the earth.

When the jack is not in use it can be folded together, so as to be convenient to handle, and occupy but little space.

I claim as my invention—

The combination of the lever A, bar B, plates C, lugs $c$, and rest D, substantially as and for the purpose set forth.

ALFRED G. COOLEY.

Witnesses:
WASH. DOGGETT,
A. D. CLARK.